United States Patent

Bergerhoff et al.

(10) Patent No.: US 6,870,471 B2
(45) Date of Patent: Mar. 22, 2005

(54) WHEEL UNIT AND METHOD FOR ACTIVATING A WHEEL UNIT

(75) Inventors: Nikolas Bergerhoff, Regensburg (DE); Martin Fischer, Regensberg (DE)

(73) Assignee: Siemens Aktiengesellschaft, Munich (DE)

( * ) Notice: Subject to any disclaimer, the term of this patent is extended or adjusted under 35 U.S.C. 154(b) by 123 days.

(21) Appl. No.: 10/279,944

(22) Filed: Oct. 24, 2002

(65) Prior Publication Data

US 2003/0090373 A1 May 15, 2003

(30) Foreign Application Priority Data

Oct. 24, 2001 (DE) .......................................... 101 52 334

(51) Int. Cl.⁷ .............................................. B60C 23/00
(52) U.S. Cl. ........................ 340/447; 340/442; 73/146; 73/146.2; 200/61.22
(58) Field of Search ................................ 340/442, 447; 73/146, 146.2; 200/61.22

(56) References Cited

U.S. PATENT DOCUMENTS

| | | | | |
|---|---|---|---|---|
| 3,787,732 A | * | 1/1974 | Larson ........................ 307/116 |
| 4,137,520 A | * | 1/1979 | Deveau ........................ 340/447 |
| 4,229,728 A | * | 10/1980 | Tremba ........................ 340/447 |
| 4,723,445 A | * | 2/1988 | Ripley et al. ............... 73/146.3 |
| 5,289,160 A | * | 2/1994 | Fiorletta ..................... 340/447 |
| 5,734,674 A | * | 3/1998 | Fenton et al. ................ 375/150 |
| 6,005,480 A | * | 12/1999 | Banzhof et al. ............. 340/447 |
| 6,199,575 B1 | * | 3/2001 | Widner ........................ 137/227 |
| 6,243,007 B1 | * | 6/2001 | McLaughlin et al. ....... 340/447 |
| 6,414,592 B1 | * | 7/2002 | Dixit et al. .................. 340/447 |

FOREIGN PATENT DOCUMENTS

| | | | |
|---|---|---|---|
| DE | 43 09 265 A1 | 10/1993 | .......... B60C/23/04 |
| DE | 693 12 949 T2 | 3/1998 | .......... B60C/23/04 |
| DE | 196 31 784 C2 | 2/1999 | .......... B60C/23/04 |
| DE | 197 20 123 C2 | 3/2001 | .......... H02J/13/00 |
| EP | 0 806 307 B1 | 5/1997 | .......... B60C/23/04 |
| WO | WO9626076 | * 8/1996 | |

* cited by examiner

Primary Examiner—Thomas J. Mullen, Jr.
Assistant Examiner—Samuel J. Walk
(74) Attorney, Agent, or Firm—Baker Botts L.L.P.

(57) ABSTRACT

A wheel unit (E1, E2, E3, E4) for a system for monitoring the wheels (R1, R2, R3, R4) of a motor vehicle (10) for error states, in particular for incorrect tire inflation pressures comprises that it can be activated by touching a wheel component, in particular with a hand.

25 Claims, 2 Drawing Sheets

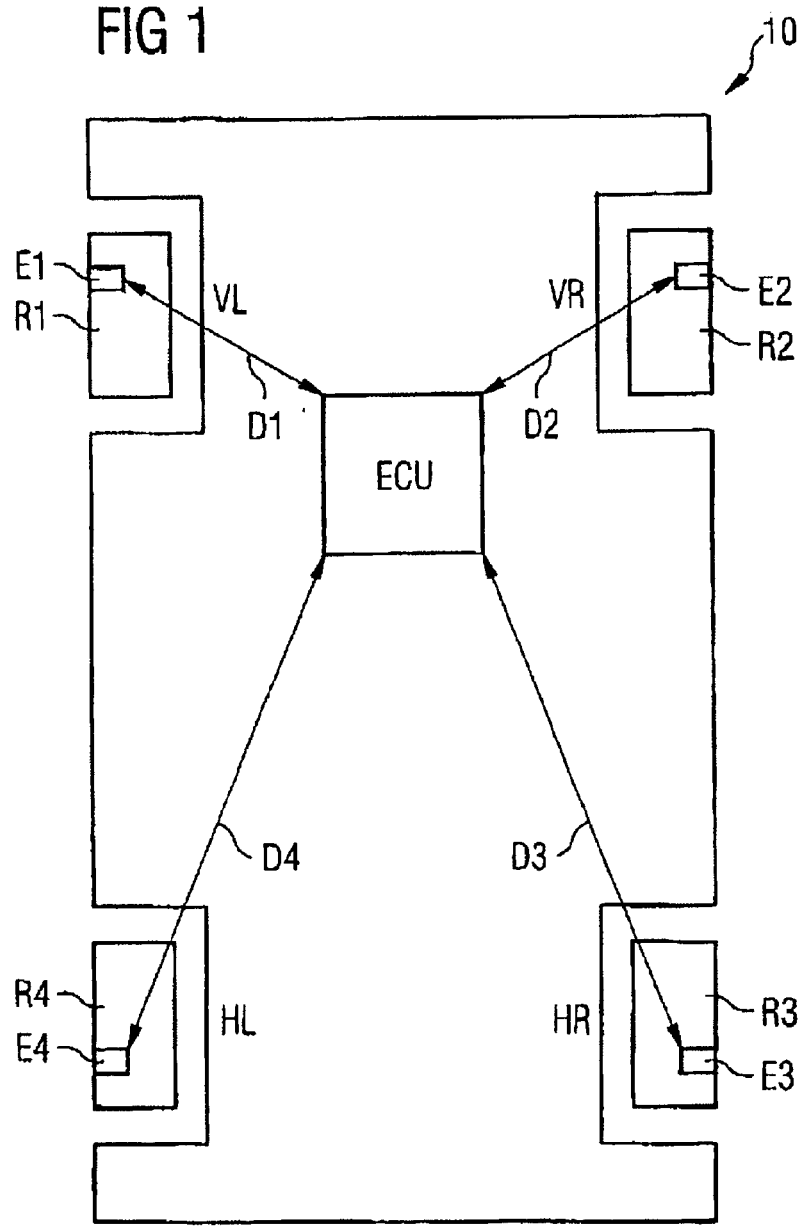

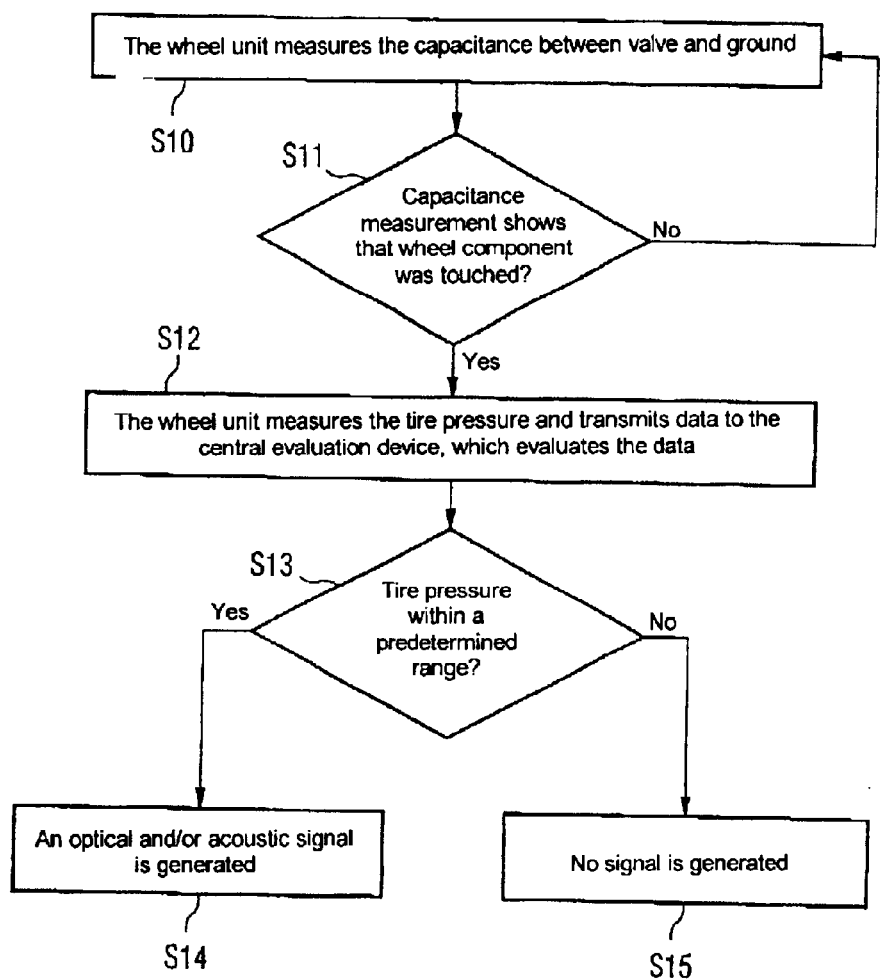

WHEEL UNIT AND METHOD FOR ACTIVATING A WHEEL UNIT

CROSS REFERENCE TO RELATED APPLICATION

This application claims priority to German application number 10152334.3 filed Oct. 24, 2001.

BACKGROUND OF THE INVENTION

The invention relates to a wheel unit for a system for monitoring the wheels of a motor vehicle for errors states, in particular for incorrect tire inflation pressures. Furthermore, the invention relates to a method for activating a wheel unit which is assigned to a wheel of a motor vehicle and is a component part of a system for monitoring the wheels of a motor vehicle for error states, in particular for incorrect tire inflation pressures.

The term error states is to be broadly interpreted in the present context and covers all states which are considered worthy of detection.

The wheel units of the generic type and the methods of the generic type are used for example in connection with systems and methods for monitoring the wheels of a motor vehicle for error states, in particular for incorrect tire inflation pressures. In this connection, it is known for example that the wheel units transmit information by high-frequency signals to a central evaluation device, which is arranged on the chassis of the motor vehicle. In the present connection, a wheel unit is to be understood as meaning any unit which rotates with a respective wheel and is suitable for supplying information or data by means of which error states possibly occurring at the wheel can be detected. In addition to the actual detection of an error state, it is generally provided that the wheel position (for example front left, front right, rear left, rear right), at least of the wheels at which an error state has occurred, is determined, in order that the error state can be indicated together with the respective wheel position.

For example, EP 0 806 307 B1 already discloses a method for carrying out the assignment of the wheel position to air pressure control devices in an air pressure control system of a motor vehicle, the motor vehicle having, inter alia, the following component parts: a number of wheels, each wheel being assigned an air pressure control device, which is capable of emitting an individual identification to a central unit, and a central unit, in which the assignment of the identification of an air pressure control device to the wheel position of each wheel is stored. In the case of the method known from EP 0 806 307 B1, the assignment of the air pressure control device to the wheel position is performed as follows: switching on of an assignment mode; emission of the individual identifications of the air pressure control device; evaluation in the central unit of which individual identification was sent from which wheel position; storing of the determined assignment in the central unit; and switching off of the assignment mode and operation of the air pressure control system in a pressure monitoring mode. For the evaluation of individual identifications, it is in this case envisaged in particular to measure a specific variable, for example the rotational wheel speed, for each wheel of the motor vehicle both with a wheel unit of the air pressure control device and with a fixed sensor with a known wheel position. Subsequently, by a comparison of the output signals of the fixed sensors and the output signals of the wheel units, the wheel position of the individual wheels is concluded.

It is known, furthermore, from DE 197 20 123 C2 to provide in the region of each wheel to be monitored a dedicated antenna, with which signals emitted by the wheel units can be received. Although each of the antennas can under some circumstances also receive signals from wheel units which are not directly adjacent to the respective antenna, according to the teaching of DE 197 20 123 C2 it is adequate for determining the wheel position of individual wheels to assume that a received signal emitted by a directly adjacent wheel unit has a higher signal level than a signal which is received from a wheel unit arranged further away.

The known systems and methods share the common drawback that they require considerable expenditure on hardware and software and are therefore expensive.

SUMMARY OF THE INVENTION

The invention is based on the object of developing the wheel units of the generic type and the methods of the generic type in such a way that the expenditure required on hardware and software is reduced.

This object is achieved by a wheel unit for a system for monitoring the wheels of a motor vehicle for error states which transmits data to a central evaluation device of the motor vehicle, wherein it can be activated by touching a wheel component, the wheel unit transmitting data to the central evaluation device of the motor vehicle as a response to the touching of the wheel component.

The data transmitted to the central evaluation device of the motor vehicle can permit the determination of the wheel position of the wheel of which the wheel component was touched. The data transmitted to the central evaluation device of the motor vehicle can further permit the determination of the tire inflation pressure of the wheel of which the wheel component was touched. The wheel may have a detector device which, for the activation of the wheel unit, generates a trigger signal when the wheel component is touched. The detector device can detect the touching of the wheel component by means of impedance measurement. The detector device may detect the touching of the wheel component by means of a measurement of the capacitance and/or the inductance between the wheel component and ground. The detector device can also detect the touching of the wheel component by means of an amplitude and/or frequency measurement. The wheel component can be the valve of the wheel. The wheel unit can be intended to be arranged at least partly in the region of the valve of the wheel. The wheel unit can have an antenna for sending and/or receiving radio signals. The antenna may be formed at least partly by the valve of the wheel. The error state can represent a state for incorrect tire inflation pressures.

A suitable method for activating a wheel unit which is assigned to a wheel of a motor vehicle and is a component part of a system for monitoring the wheels of a motor vehicle for error states, comprises the steps of: the activation of the wheel unit takes place by touching a wheel component, and the wheel unit transmits data to a central evaluation device of the motor vehicle as a response to the touching of the wheel component.

The data transmitted to the central evaluation device of the motor vehicle permit the determination of the wheel position of the wheel of which the wheel component was touched. The data transmitted to the central evaluation device of the motor vehicle can permit the determination of the tire inflation pressure of the wheel of which the wheel component was touched. The wheel unit can have a detector device which, for the activation of the wheel unit, generates a trigger signal when the wheel component is touched. The detector device can detect the touching of the wheel component by means of impedance measurement. The detector device can also detect the touching of the wheel component by means of a measurement of the capacitance and/or the inductance between the wheel component and ground. The detector device can further detect the touching of the wheel component by means of an amplitude and/or frequency measurement. The wheel component can be the valve of the wheel. The wheel unit may be provided at least partly in the region of the valve of the wheel. The wheel unit can have an antenna for sending and/or receiving radio signals. The antenna may be formed at least partly by the valve of the wheel. The error state may represent a state for incorrect tire inflation pressures. The touching can be performed mannually by hand.

The wheel unit according to the invention is based on the generic prior art in that it can be activated by touching a wheel component, in particular with a hand. As a response to the activation of the wheel unit, the latter can supply data which are suitable exclusively for determining the wheel position, which are suitable exclusively for detecting an error state or which are suitable both for determining the wheel position and for detecting error states. If the wheel units have devices for evaluating the data and for indicating an error state, the system according to the invention is suitable in particular for retrofitting a motor vehicle. This applies in particular if the wheel unit is combined at least partly with a valve of the wheel. For example, it is possible that, as a response to the activation, the wheel unit checks the tire inflation pressure and, in the case of a correct tire inflation pressure, generates an optical signal, while it indicates an error state by not generating an optical signal.

In the case of preferred embodiments of the wheel unit according to the invention, it is provided that it has a detector device which, for the activation of the wheel unit, generates a trigger signal when the wheel component is touched. The trigger signal may be used, for example, by further devices of the wheel unit and/or by a central evaluation device to initiate further steps. Coming into consideration in particular as touch-sensitive components are electrically conducting components of the wheel.

An advantageous development of the wheel unit according to invention provides that the detector device detects the touching of the wheel component by means of an impedance measurement.

In the case of the wheel unit according to the invention, it may be provided furthermore that the detector device detects the touching of the wheel component by means of a measurement of the capacitance and/or the inductance between the wheel component and ground.

Also coming into consideration are embodiments of the wheel unit according to the invention in which it is provided that the detector device detects the touching of the wheel component by means of an amplitude and/or frequency measurement.

It is considered to be particularly advantageous for all embodiments of the wheel unit according to the invention if it is provided that the wheel component is the valve of the wheel. This applies in particular if the wheel unit is provided completely in the region of the valve or if the wheel unit according to the invention is combined with a valve in such a way that a conventional valve can be exchanged for a valve having the wheel unit according to the invention. An embodiment of this type is advantageous in particular if the wheel unit according to the invention is intended for a retrofittable system for monitoring the wheels of a motor vehicle for error states.

For the reasons explained above, it is at least preferred for the wheel unit according to the invention that it is intended to be arranged at least partly in the region of the valve of the wheel.

In this case it may be provided furthermore that it has an antenna for sending and/or receiving radio signals. The radio signals may in this case be used in particular for transmitting data from and to a central evaluation device of a system for monitoring the wheels of a motor vehicle.

In this connection, an advantageous development of the wheel unit according to the invention provides that the antenna is formed at least partly by the valve of the wheel. In this case, it may be advantageous if the portions of the valve serving as the antenna are electrically insulated from other electrically conducting components of the wheel.

It may be provided in the case of some configurations of the wheel unit according to the invention that, as a response to the touching of the wheel component, it transmits data to a central evaluation device of the motor vehicle. The transmission of the data may in this case take place for example by means of the already mentioned radio signals, in particular by means of high-frequency radio signals.

In this connection, it may be provided furthermore in the case of the wheel unit according to the invention that the data transmitted to the central evaluation device of the motor vehicle permit the determination of the wheel position of the wheel of which the wheel component has been touched. In this connection, it may be provided for example that the wheel unit of which the wheel component has been touched transmits data to a central evaluation device which are compared there with data which, for example, represent the error state of a wheel. If these data match, an acoustic and/or optical signal can be generated, indicating to the driver that he has touched the wheel component of the wheel at which the error state has occurred.

In the case of the wheel unit according to the invention, it may additionally or alternatively be provided that the data transmitted to the central evaluation device of the motor vehicle permit the determination of the tire inflation pressure of the wheel of which the wheel component was touched. In particular in the case of an embodiment of the wheel unit according to the invention intended for retrofitting, it may be provided that the wheel unit has indicating devices which, after the wheel component has been touched, indicate whether or not an error state has occurred at the wheel of which the wheel component was touched.

The method according to the invention is based on the generic prior art in that the activation of the wheel unit takes place by touching a wheel component, in particular with a hand. This gives rise to the advantages explained in connection with the wheel unit according to the invention in the same or a similar way, for which reason reference is made to the corresponding statements to avoid repetition.

The same applies analogously to the following preferred embodiments of the method according to the invention, reference also being made with respect to the advantages which can be achieved by these embodiments to the corresponding statements in connection with the wheel unit according to the invention.

Preferred embodiments of the method according to the invention provide that the wheel unit has a detector device, which for activating the wheel unit generates a trigger signal when the wheel component is touched.

The method according to the invention may provide furthermore that the detector device detects the touching of the wheel component by means of an impedance measurement.

Additionally or alternatively, the method according to the invention may provide that the detector device detects the touching of the wheel component by means of a measurement of the capacitance and/or the inductance between the wheel component and ground.

Furthermore, it may be provided in this connection that the detector device detects the touching of the wheel component by means of an amplitude and/or frequency measurement.

In the case of preferred embodiments of the method according to the invention, it provides that the wheel component is the valve of the wheel.

Also in connection with the method according to the invention, it is preferred that the wheel unit is provided at least partly in the region of the valve of the wheel.

The method according to the invention may be developed in an advantageous way by the wheel unit having an antenna for sending and/or receiving radio signals.

In this connection, it may be provided furthermore that the antenna is formed at least partly by the valve of the wheel.

It is considered to be advantageous in the case of certain embodiments of the method according to the invention if it is provided that, as a response to the touching of the wheel component, the wheel unit transmits data to a central evaluation device of the motor vehicle.

In this case, a preferred development provides that the data transmitted to the central evaluation device of the motor vehicle permit the determination of the wheel position of the wheel of which the wheel component was touched.

Additionally or alternatively, the method according to the invention may provide that the data transmitted to the central evaluation device of the motor vehicle permit the determination of the tire inflation pressure of the wheel of which the wheel component was touched.

Any system which is suitable for carrying out an embodiment of the method according to the invention comes within the extent of protection of the associated claims.

BRIEF DESCRIPTION OF THE DRAWINGS

The invention is now explained by way of example on the basis of preferred embodiments with reference to the accompanying drawings, in which:

FIG. 1 shows a schematic block diagram of a motor vehicle which is equipped with four wheel units according to the invention, which are a component part of a system for monitoring the wheels of the motor vehicle; and FIG. 2 shows a flow diagram which illustrates an embodiment of the method according to the invention.

DETAILED DESCRIPTION OF THE PREFERRED EMBODIMENTS

FIG. 1 shows a schematic block diagram of a motor vehicle which is equipped with four wheel sensors according to the invention, which are a component part of a system for monitoring the wheels of the motor vehicle. In this case, the motor vehicle as a whole is provided with the reference numeral 10. The motor vehicle 10 has four wheels R1, R2, R3, R4. Each of the wheels R1, R2, R3, R4 is assigned a wheel unit E1, E2, E3, E4, which may be arranged for example in the tire and/or in the region of the valve of the respective wheel R1, R2, R3, R4. The front left wheel position is identified as VL, the front right wheel position is identified as VR, the rear left wheel position is identified as HL and the rear right wheel position is identified as HR.

According to the representation of FIG. 1, a central evaluation device ECU is provided. The central evaluation device ECU can exchange data D1, D2, D3, D4 with the respective wheel units E1, E2, E3, E4, preferably by means of high-frequency signals. Each of the wheel units E1, E2, E3, E4 can be activated by touching, in particular with a hand. However, this does not rule out the possibility that the wheel units E1, E2, E3, E4 can also be activated for example by the central evaluation device ECU, for example if the latter emits trigger radio signals, which are received by receivers which are assigned to the wheel units E1, E2, E3, E4. With respect to the representation of FIG. 1, it is possible for example that the wheel units E1, E2, E3, E4 according to the invention regularly transmit data D1, D2, D3, D4 to the central evaluation device ECU, which evaluates these data in order to detect possible error states. As a reaction to the indication of an error state, the driver may, for example, stop the vehicle 10 and touch the wheel component of a first wheel unit E1, E2, E3, E4. In response to this, the wheel unit E1, E2, E3, E4 of which the wheel component was touched can transmit to the central evaluation device data D1, D2, D3, D4 which may correspond in particular to the data last transmitted to the central evaluation device ECU. In response to this, the central evaluation device ECU may check whether the data D1, D2, D3, D4 transmitted by the wheel unit E1, E2, E3, E4 of which the wheel component was touched correspond to the stored data by means of which the error state was concluded. If this is the case, an optical and/or acoustic signal may be generated, for example. The driver is thereby informed that he has touched the wheel component of the wheel R1, R2, R3, R4 at which the error state occurred.

FIG. 2 shows a flow diagram which illustrates an embodiment of the method according to the invention, the reference numerals used in the explanation which follows relating to FIG. 1. In the step S10, each wheel unit E1, E2, E3, E4 measures the capacitance between the valve of the wheel R1, R2, R3, R4 to which it is assigned and ground. Subsequently, in the step S11, it is checked whether the capacitance measurement shows that one of the wheel components E1, E2, E3, E4 has been touched. If this is not the case, the method returns to the step S10. If it is established in the step S11 that the wheel component of a wheel unit E1, E2, E3, E4 has been touched, the method continues to the step S12. As an example, it will be assumed that it is established in the step S11 that the wheel component of the wheel unit E1, which is assigned to the wheel R1, has been touched. In this case, in the step S12, the wheel unit E1 measures the tire pressure and transmits data D1 to the central evaluation device ECU, which evaluates the data. Subsequently, in the step S13, it is checked whether the tire pressure lies within a predetermined range. If this is the case, an optical and/or acoustic signal is generated in the step S14, indicating that the tire pressure in the wheel R1 is correct. If it is established in the step S13 that the tire pressure in the wheel R1 does not lie within a predetermined range, the method continues with the step S15, in that no signal is generated. That an error state is indicated by no signal being generated is considered to be advantageous, because in this case the failure of a wheel unit is likewise indicated as an error state.

Although not represented in the figures, embodiments in which the wheel units themselves have devices for evaluating the data are also conceivable. In this case, all the wheel units are preferably also assigned indicating devices with which an error state can be indicated. Embodiments of this type are advantageous in particular in connection with the retrofitting of motor vehicles.

The features of the invention disclosed in the above description, in the drawings and in the claims may be important for realizing the invention both individually and in any desired combination.

What is claimed is:

1. A wheel unit for a system for monitoring the wheels of a motor vehicle for error states which transmits data to a central evaluation device of the motor vehicle, wherein the wheel unit can be activated by a trigger signal resulting from touching a wheel component, the wheel unit transmitting data to the central evaluation device of the motor vehicle as a response to the touching of the wheel component.

2. The wheel unit as claimed in claim 1, wherein the data transmitted to the central evaluation device of the motor vehicle permit the determination of the wheel position of the wheel of which the wheel component was touched.

3. The wheel unit as claimed in claim 1, wherein the data transmitted to the central evaluation device of the motor vehicle permit the determination of the tire inflation pressure of the wheel of which the wheel component was touched.

4. The wheel unit as claimed in claim 1, wherein the wheel unit has a detector device which, for the activation of the wheel unit, generates a trigger signal when the wheel component is touched.

5. The wheel unit as claimed in claim 4, wherein the detector device detects the touching of the wheel component by means of impedance measurement.

6. The wheel unit as claimed in claim 4, wherein the detector device detects the touching of the wheel component by means of a measurement of the capacitance and/or the inductance between the wheel component and ground.

7. The wheel unit as claimed in claim 4, wherein the detector device detects the touching of the wheel component by means of an amplitude and/or frequency measurement.

8. The wheel unit as claimed in claim 1, wherein the wheel component is the valve of the wheel.

9. The wheel unit as claimed in claim 1, wherein the wheel unit is intended to be arranged at least partly in the region of the valve of the wheel.

10. The wheel unit as claimed in claim 1, wherein the wheel unit has an antenna for sending and/or receiving radio signals.

11. The wheel unit as claimed in claim 10, wherein the antenna is formed at least partly by the valve of the wheel.

12. The wheel unit as claimed in claim 1, wherein the error state represents a state for incorrect tire inflation pressures.

13. A method for activating a wheel unit which is assigned to a wheel of a motor vehicle and is a component part of a system for monitoring the wheels of a motor vehicle for error states, wherein the activation of the wheel unit takes place in response to a trigger signal resulting from touching a wheel component, the wheel unit transmitting data to a central evaluation device of the motor vehicle as a response to the touching of the wheel component.

14. The method as claimed in claim 13, wherein the data transmitted to the central evaluation device of the motor vehicle permit the determination of the wheel position of the wheel of which the wheel component was touched.

15. The method as claimed in claim 13, wherein the data transmitted to the central evaluation device of the motor vehicle permit the determination of the tire inflation pressure of the wheel of which the wheel component was touched.

16. The method as claimed in claim 13, wherein the wheel unit has a detector device which, for the activation of the wheel unit, generates a trigger signal when the wheel component is touched.

17. The method as claimed in claim 16, wherein the detector device detects the touching of the wheel component by means of impedance measurement.

18. The method as claimed in claim 16, wherein the detector device detects the touching of the wheel component by means of a measurement of the capacitance and/or the inductance between the wheel component and ground.

19. The method as claimed in claim 16, wherein the detector device detects the touching of the wheel component by means of an amplitude and/or frequency measurement.

20. The method as claimed in claim 13, wherein the wheel component is the valve of the wheel.

21. The method as claimed in claim 13, wherein the wheel unit is provided at least partly in the region of the valve of the wheel.

22. The method as claimed in claim 13, wherein the wheel unit has an antenna for sending and/or receiving radio signals.

23. The method as claimed in claim 22, wherein the antenna is formed at least partly by the valve of the wheel.

24. The method as claimed in claim 13, wherein the error state represents a state for incorrect tire inflation pressures.

25. The method as claimed in claim 13, wherein the touching is performed manually by hand.

* * * * *